United States Patent [19]

Nowaczyk

[11] 4,331,978
[45] May 25, 1982

[54] VOLTAGE REGULATOR/ACTIVE FILTER FOR TELEVISION RECEIVER

[75] Inventor: Philip J. Nowaczyk, Chicago, Ill.

[73] Assignee: Zenith Radio Corporation, Glenview, Ill.

[21] Appl. No.: 212,371

[22] Filed: Dec. 3, 1980

[51] Int. Cl.³ ............................................. H04N 5/44
[52] U.S. Cl. .................................................. 358/190
[58] Field of Search ......................................... 358/190

[56] References Cited
U.S. PATENT DOCUMENTS 3,493,685  2/1970  Attwood ..................... 358/190 X
3,752,903  8/1973  Newman et al. ................. 358/190

Primary Examiner—Robert L. Richardson
Attorney, Agent, or Firm—Jack Kail; John Moore

[57] ABSTRACT

Video display distortion in a television receiver introduced by input voltage excursions is compensated for by a voltage regulation circuit which tracks the changing input line voltage while automatically switching to an active filter mode once the line voltage has decreased to a predetermined level. This permits the removal of AC transients from the fluctuating input signal and avoids display degradation resulting therefrom.

10 Claims, 1 Drawing Figure

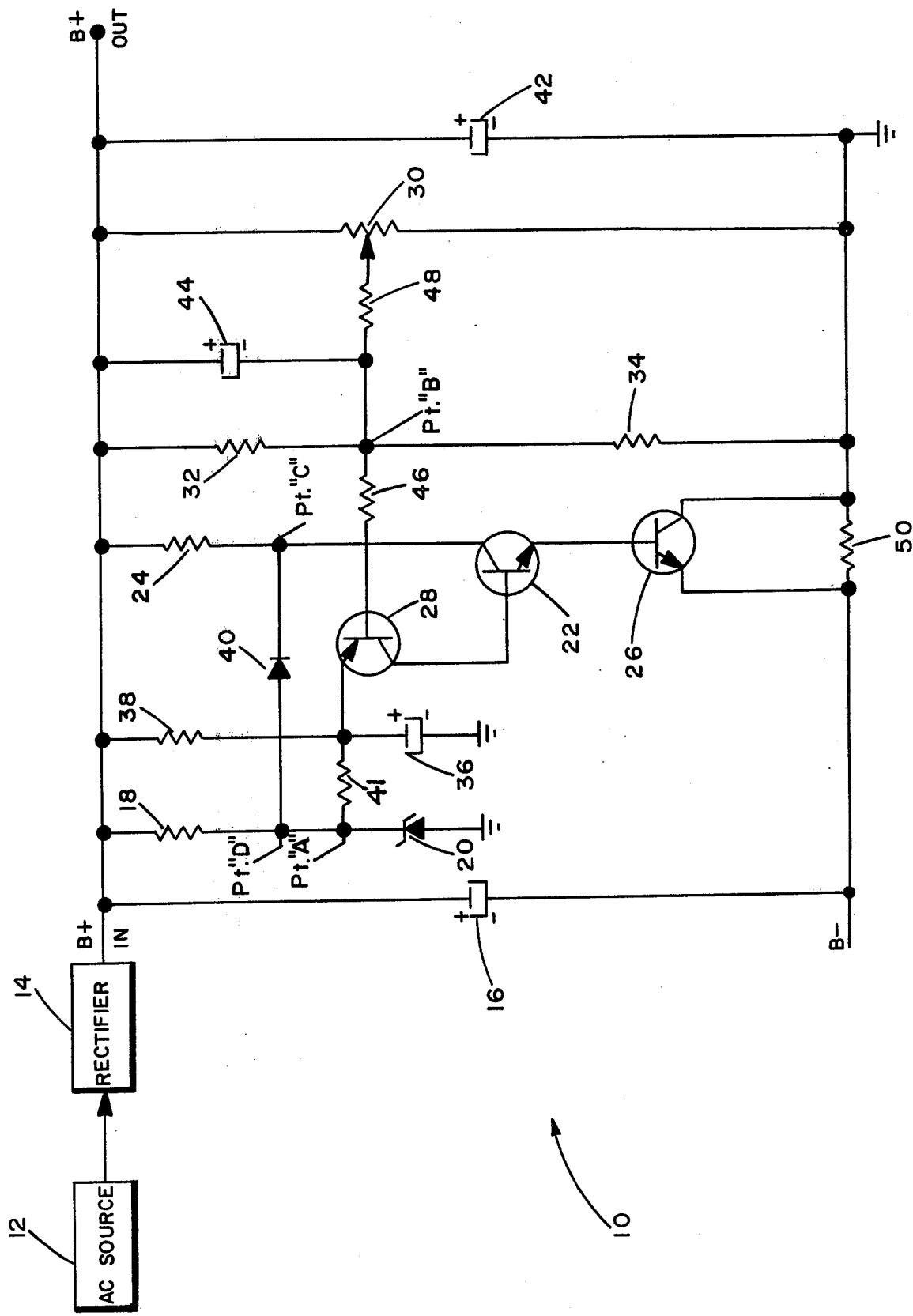

VOLTAGE REGULATOR/ACTIVE FILTER FOR TELEVISION RECEIVER

BACKGROUND OF THE INVENTION

This invention relates in general to television receiver voltage regulators, and in particular to a voltage regulator for permitting a television receiver to operate free from video display distortion caused by input voltage excursions.

Effective voltage regulation in a television receiver is essential for optimum receiver operation and display of video information. An excessively large increase in input voltage could result in component damage and display degradation due to arcing in such components as the deflection yoke or picture tube. High voltage conditions may also cause excessive radiation from the cathode ray tube. Large input voltage excursions on the low end cause video display degradation in the form of objectionable diminishing of the video image size. In addition, low input line voltages cause excessive distortion and break-up of the video display due to excessive ripple of the input signal.

The prior art discloses various attempts to precisely regulate the input voltage to a television receiver in order to avoid these problems. One approach is described in U.S. Pat. No. 3,641,267 to Cavallari directed to a voltage-step-down circuit for a television receiver for minimizing the effect of wide variations in input voltage on the output signal. The circuit includes a Zener diode in the input circuit of either the main chopping transistor, which is normally blocked and is used in driving the sweep circuits of the television receiver, or an ancillary transistor connected ahead of the main transistor in cascade therewith. This arrangement limits the base current and therefore the collector current of the associated transistor thereby limiting the amplitude of the pulse to be integrated. Where the integrating network includes the primary winding of a transformer with a secondary winding driving the chopping transistor, the current through the primary winding may vary inasmuch as any excess secondary current as dissipated through the Zener diode connected between the base and emitter of the associated transistor. As a result, any change in load current imparts only a negligible effect upon the integrated output voltage. Even when thus stabilized, however, this system is capable of developing transient voltages producing ripple distortion in the video presentation and possibly even leading to breakdown of the chopping transistor.

Another related system for stabilizing the DC input provided to a television receiver is disclosed in U.S. Pat. No. 3,629,497 to Soardi et al. This invention is intended to improve the previously described patent in that the collector current of the first transistor must necessarily pass through the emitter of the second transistor, in contrast to the operation of the previously discussed patent in which the second transistor is provided with its own independent input circuit from another transformer secondary. In Soardi the first transistor in its blocked condition effectively cuts off the second transistor and insulates it from any transient voltage appearing on the input to the chopper network. The insertion of a high value resistor in the conductive connection between the bases of these two transistors allegedly prevents any discharge of the capacitive branch of the interstage coupling network through the emitter and base of the second transistor. By thus coupling both chopping transistors to a single transformer winding the power supply output is apparently stabilized against fluctuations in input drive voltage. Thus, this invention is concerned with the stability of the DC output level and fails to address video display distortion caused by AC components of a fluctuating, low direct voltage input signal.

Still another approach to DC input level control in a television receiver is described in U.S. Pat. No. 4,028,726 to Argy wherein is described an improved image raster expanding system for a television receiver. This system combines horizontal and vertical overscan blanking with enhanced contrast and color level control in compensating for deterioration in contrast in brightness levels of the image commonly experienced in raster expansion. By adjusting the horizontal and vertical overscan blanking pulses to optimize picture tube brightness and contrast in blanking those portions of the image which are beyond the image screen, this system is capable of providing a non-degraded video display in the raster expended, or "zoom", mode of operation. This reference is cited not because it attempts to stabilize the signal provided to television circuitry in the presence of fluctuating input voltages, but to show one approach to raster size control which becomes a problem in the presence of input drive signal fluctuations.

These and other problems encountered in the prior art are avoided by the present invention which provides a non-degraded video presentation in a television receiver in the presence of reduced input signal levels caused by utility line level fluctuations due to "brownouts", home appliance start-up, temporary increased utility loads, or any other large drain on a utility power line.

OBJECTS OF THE INVENTION

Accordingly, it is an object of the present invention to provide an improved voltage regulator for a television receiver.

It is another object of the present invention to provide an improved television receiver voltage regulator capable of eliminating video display distortion caused by fluctuation in input line voltage.

Still another object of the present invention is to provide an improved voltage regulator/active filter for a television receiver which precisely regulates input voltage while continuing to provide active filtering at reduced input voltage levels.

BRIEF DESCRIPTION OF THE DRAWING

The appended claims set forth those novel features believed characteristic of the invention. However, the invention itself as well as further objects and advantages thereof, will best be understood by reference to the following detailed description of a preferred embodiment taken in conjunction with the accompanying drawing in which the FIGURE, which is partially in block diagram form and partially in schematic diagram form, shows a voltage regulator/active filter for a television receiver in accordance with a preferred embodiment of the present invention.

DESCRIPTION OF THE PREFERRED EMBODIMENT

Referring to the FIGURE, there is shown a voltage regulator/active filter 10 for a television receiver in accordance with a preferred embodiment of the present invention. Input power is provided by a source of alternating input voltage 12 such as a utility outlet of 120 VAC. The AC input is then converted to a DC level by means of rectifier 14 in the television receiver which may be comprised of conventional bridge rectifier circuitry. The output of rectifier 14 is the B+ input voltage provided to television receiver circuitry.

In accordance with a preferred embodiment of the present invention, a B+ voltage of 17.5 VDC is provided to the voltage regulator/active filter 10 of the present invention. Capacitor 16 is coupled across the rectified B+ input to voltage regulator/active filter 10 and converts the pulsating input DC into a DC voltage level with an AC ripple component imposed upon it. Capacitor 16 is connected from the B+ input to a B− ground which, in the preferred embodiment of the present invention, is maintained at a −4 VDC. Resistor 18 is a current feed resistor for Zener diode 20 which, in turn, couples resistor 18 to neutral ground potential. Zener diode 120 performs the function of a reference diode which establishes a fixed reference voltage level relative to the input B+ voltage. In the preferred embodiment of the present invention reference diode 20 establishes a voltage of 4.7 VDC at point "A" as shown in the FIGURE. The present invention is not limited in its operation to the aforementioned specific operating parameters. These, and subsequently cited, values are incorporated merely to indicate typical values in a preferred embodiment of the present invention as envisioned by the inventor.

Transistor 22 is coupled to the input B+ voltage through resistor 24. Transistor 22, termed the error amplifier, is the current amplifier stage in a modified darlington configuration. This is a modified darlington configuration because rather than the collector of error amplifier 22 being returned to the collector of regulator transistor 26 to which it is coupled, the collector of error amplifier 22 is returned through resistor 24 to the B+ supply for its current drive. By means of the voltage loop comprised of resistor 24, the collector and emitter junctions of error amplifier 22, the base-emitter junction of regulator transistor 26, and the B− potential established by capacitor 16, the collector of error amplifier 22 operates as a voltage divider in tracking the B+ input voltage at a voltage level between B+ and B−. Thus, fluctuations in the B+ input voltage will result in variations in the voltage across the collector-emitter junction of error amplifier 22 which variations will track at a predetermined voltage offset from the B+ input voltage. The predetermined voltage offset is established by the selected value of resistor 24. This tracking capability of the present invention is an essential element of voltage regulator/active filter 10 in converting its operation from strictly a voltage regulator at normal B+ input levels to an active filter when the B+ input voltage drops below a predetermined value.

Thus, a reference voltage level primarily provided by Zener diode 20 and a tracking voltage primarily provided by the combination of resistor 24, error amplifier 22 and regulator 26 are utilized in the present invention. The tracking voltage follows the input B+ voltage and is displaced a predetermined voltage below the instantaneous value of the fluctuating B+ input. These fluctuations may be caused by "brownouts", household appliance start-up, or any other load on the utility line causing variations in line voltage levels.

A comparison is made between the reference voltage level established by Zener diode 20 at point "A" and the output voltage at point "B" by means of comparator amplifier 28. The base of comparator transistor 28 is coupled to the output voltage divider network comprised of resistors 30, 32 and 34. This resistive network samples the output voltage and provides a divided-down sampled output voltage signal to the base of comparator transistor 28. With the emitter of transistor 28 coupled to the reference voltage level at point "A", and its collector connected to the base of error amplifier 22, comparator amplifier 28 is turned on or off by virtue of the relative magnitudes of the divided-down output voltage at point "B" and the reference voltage level at point "A". The output signal on the collector of comparator amplifier 28 provided to the base of error amplifier 22 thus represents an amplified and inverted signal corresponding to the difference between the output of voltage regulator/active filter 10 and the reference voltage level. Thus, when the divided-down B+ output voltage applied to the base of comparator amplifier 28 drops 0.7 volts below the reference voltage level of point "A" applied to the emitter of comparator amplifier 28, comparator amplifier 28 is turned on with its amplified collector output coupled to the base of error amplifier 22 and thus controlls the input tracking voltage level. Capacitor 36 couples the junction of point "A" and the emitter of comparator amplifier 28 to neutral ground potential. In turn, capacitor 36 is coupled to the B+ input voltage by means of resistor 38 which performs the function of a voltage divider in combination with resistor 41. This configuration, in particular by means of the returning of the collector current of error amplifier 22 to the B+ input signal via resistor 24, permits the voltage regulator/active filter 10 to automatically perform the functions of an active filter when the output B+ voltage drops below a predetermined reference voltage level, as will be presently explained.

Diode 40 in combination with comparator amplifier 28 operates in the following manner to produce a variable reference voltage which changes as the B+ input voltage fluctuates. When the tracking voltage at point "C" drops one diode drop of switching diode 40 below the reference voltage at point "D", diode 40 becomes forward biased and begins conducting. With diode 40 no longer reversed biased it pulls current through resistor 18 and thus removes current from reference diode 20. Zener diode 20 is no longer able to maintain its reference voltage and thus the voltage at points "A" and "D" drops below the reference voltage with the result that, by means of comparator amplifier 28, the reference voltage becomes a variable voltage which tracks the varying B+ input voltage. This decrease in the reference voltage reduces the current provided to the emitter of comparator amplifier 28 and consequently reduces the drive signal provided to the transistor combination of error amplifier 22 and regulator amplifier 26. This has the effect of reducing the B+ output signal to a level below the B+ input level with the output signal level tracking the input signal level and displaced a predetermined voltage below. With the B+ output signal tracking the B+ input signal, when the input signal goes below the reference voltage level a predetermined value, filter capacitor 36 and associated resistors are incorporated in the control circuit for the B+ output. This permits the filtering of AC ripple from the reduced B+ output drive signal and eliminates video display distortion resulting therefrom. Thus, in a television receiver incorporating the present invention while the video display size will diminish if the B+ input voltage decreases, the smaller video display size will not suffer from the distortions cause by AC ripple in the B+ output signal.

Following the precise regulation and AC filtering of the B+ input signal by the present invention, a B+ output signal is provided to various television receiver systems such as brightness and contrast controls and deflection circuitry. Capacitor 42 filters from the B+ output signal high frequency noise. Its value is chosen to preclude oscillation of voltage regulator/active filter 10 and is a function of the beta value of comparator amplifier 28. Resistor 30 permits the adjustment of the B+ output voltage level. Capacitor 44 allows for B+ adjustments for fast signal transients on the load side of voltage regulator/active filter 10. Resistor 46 is an arc limiter protecting transistor junctions from high voltage CRT arcing. Resistor 48 in combination with resistors 32 and 34 forms a coarse voltage divider network for the B+ output voltage. Fine adjustments to the B+ output signal are made by means of resistors 48 and 30. Resistor 50 is a relief resistor which permits regulator amplifier 26 to operate at a lower temperature by by-passing current which normally would pass through this transistor. This increases reliability of the voltage regulator/active filter of the present invention.

In a practical example of the present invention, the following values are assigned to various components of the voltage regulator/active filter to provide the previously discussed B+ voltage regulation and AC filtering in eliminating distortion caused by fluctuations in the B+ input signal:

| Reference No. | Preferred Value |
|---|---|
| 16 | 2200 Farads |
| 18 | 1.2 Kilohms |
| 24 | 330 Ohms |
| 30 | 10 Kilohms (adjustable) |
| 32 | 27 Kilohms |
| 34 | 12 Kilohms |
| 36 | 220 Farads |
| 38 | 22 Kilohms |
| 42 | 220 Farads |
| 44 | 10 Microfarads |
| 46 | 100 Ohms |
| 48 | 33 Kilohms |
| 50 | 15 Ohms |

There has thus been shown a voltage regulator/active filter which eliminates video display distortion in a television receiver caused by fluctuations in the line voltage driving the television receiver. By tracking the changing input line voltage while automatically switching to an active filter mode once the line voltage has decreased to a predetermined voltage level, AC transients originating from the fluctuating input signal can be eliminated from the B+ output signal used to drive various television receiver systems.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A voltage regulator/active filter circuit in a television receiver for precisely regulating a DC input voltage and removing an alternating current component therefrom when said input voltage fluctuates comprising:
   a fixed DC reference level source;
   voltage level tracking means coupled to said DC input voltage for providing a tracking signal displaced a predetermined voltage level below the DC input voltage;
   means for comparing said tracking signal level with said DC reference level and for generating a variable DC reference level is response to said tracking signal when said tracking signal is less than said reference voltage level;
   AC filter means for removing AC signal components exceeding a predetermined AC signal level; and
   switch means for coupling said AC filter means in circuit with said variable DC signal generating means when said tracking signal is less than said predetermined voltage level for removing AC fluctuations from said variable DC signal in providing a level DC output signal to television receiver circuitry when said input voltage fluctuates.

2. The circuit as described in claim 1 wherein said DC reference level source is comprised of a Zener diode coupling said DC input voltage to neutral ground potential.

3. The circuit as described in claim 1 wherein said tracking means comprises first and second transistor means coupled to said input voltage by means of a serially connected resistor means.

4. The circuit as described in claim 1 wherein said tracking means comprises resistor means connected in series with first and second transistor means, said resistor means being coupled between said DC input voltage and the collector electrode of said first transistor means with the emitter electrode of said first transistor means being coupled to the base electrode of said second transistor means.

5. The circuit as described in claim 3 whereby said tracking signal level is determined by the value of said resistor means.

6. The circuit as described in claim 3 wherein said comparing means comprises third transistor means coupled between said DC reference level source and said voltage level tracking means so as to provide a control signal to the base electrode of said first transistor means.

7. The circuit as described in claim 6 wherein the emitter electrode of said third transistor means is coupled to said DC reference level with its base electrode coupled to said tracking means and its collector electrode coupled to the base electrode of said first transistor means.

8. The circuit as described in claim 1 wherein said switching means comprises diode conducting means coupled between said DC reference level source and said voltage level tracking means such that said diode conducting means is rendered conductive when said tracking signal level is less than said DC reference level.

9. The circuit as in claim 1 wherein said AC filter means comprises capacitor means coupled between the junction of said DC reference level source and said comparing means and ground neutral potential.

10. A voltage regulator/active filter circuit in a television receiver for precisely regulating a DC input voltage and removing an alternating current component therefrom when said input voltage fluctuates comprising:
- a fixed DC reference level source including a Zener diode coupling said DC input voltage to neutral ground potential;
- voltage level tracking means coupled to said DC input voltage for providing a tracking signal displaced a predetermined voltage level below the DC input voltage, said tracking means including resistor means connected in series with first and second transistor means, said resistor means being coupled between said DC input voltage and the collector electrode of said first transistor means with the emitter electrode of said first transistor means being coupled to the base of said second transistor means, the value of said resistor means determining said tracking signal level;
- means for comparing said tracking signal level with said DC reference level and for generating a variable DC reference level in response to said tracking signal when said tracking signal is less than said reference voltage level, said comparing means including third transistor means coupled between said DC reference level source and said voltage level tracking means with the emitter electrode of said third transistor means coupled to said DC reference level source, its base electrode coupled to said tracking means, and its collector electrode coupled to the base electrode of said first transistor means;
- AC filter means coupled between the junction of said DC reference level source and said comparing means and ground neutral potential for removing AC signal components exceeding a predetermined AC signal level; and
- switch means for coupling said AC filter means in circuit with said variable DC signal generating means when said tracking signal is less than said predetermined voltage level for removing AC fluctuations from said variable DC signal in providing a level DC output signal to television receiver circiutry when said input voltage fluctuates, said switch means including diode conducting means coupled between said DC reference level source and said voltage level tracking means such that said diode conducting means is rendered conductive when said tracking signal level is less than said DC reference level.

* * * * *